US006665586B1

(12) United States Patent
Ball et al.

(10) Patent No.: US 6,665,586 B1
(45) Date of Patent: Dec. 16, 2003

(54) METHOD FOR DISTRIBUTING DOCUMENTS

(75) Inventors: Craig W. Ball, Indianola, IA (US); Samuel Adams Thompson, IV, Norwalk, IA (US); Bryan Conrad Huff, Ankeny, IA (US)

(73) Assignee: The Printer, Inc., Des Moines, IA (US)

( * ) Notice: Subject to any disclaimer, the term of this patent is extended or adjusted under 35 U.S.C. 154(b) by 12 days.

(21) Appl. No.: 10/235,882

(22) Filed: Sep. 5, 2002

(51) Int. Cl.[7] .................................................. G06F 7/00

(52) U.S. Cl. ........................................ 700/226; 700/227

(58) Field of Search ................................. 700/226, 227, 700/236; 705/26, 29

(56) References Cited

U.S. PATENT DOCUMENTS

| | | | | |
|---|---|---|---|---|
| 5,040,132 A | | 8/1991 | Schuricht et al. | |
| 5,278,947 A | | 1/1994 | Balga, Jr. et al. | |
| 5,414,974 A | * | 5/1995 | Van de Ven et al. | 53/399 |
| 5,583,970 A | | 12/1996 | Strobel | |
| 5,894,558 A | * | 4/1999 | Falker | 709/239 |
| 2001/0034608 A1 | | 10/2001 | Gendreau | |
| 2002/0032573 A1 | | 3/2002 | Williams et al. | |
| 2002/0095347 A1 | | 7/2002 | Cummiskey | |

OTHER PUBLICATIONS

PlanetPress® Suite Version 3, with Intelligent Forms is Objectif Lune's Printer centric electronic forms solution. The web address is at Empoweryourprinter.com.

* cited by examiner

*Primary Examiner*—Gene O. Crawford
(74) *Attorney, Agent, or Firm*—McKee, Voorhees & Sease, P.L.C.

(57) ABSTRACT

A method of printing and distributing time sensitive documents. The method of printing includes receiving an intended delivery location with each of a plurality of documents, determining a time required to deliver each document to the intended delivery location, determining a desired date of receipt and printing each document to allow for the time required to deliver each document on the desired date of receipt. Moreover, each document can be printed in-line with a corresponding shipping label. The documents and shipping labels may be customer specific. The shipping labels can also be secured to the documents, by stapling, binding, gluing or any other means, in-line to avoid many problems.

7 Claims, 8 Drawing Sheets

METHOD FOR DISTRIBUTING DOCUMENTS

BACKGROUND OF THE INVENTION

1. Field of the Invention

The present invention relates generally to a method for printing customer specific documents in a manner to ensure a specific date of delivery. More particularly, though not exclusively, the present invention relates to managing large print jobs. Each print job generates documents and shipping materials such that a single packet of materials is produced without the need to match and merge printed documents in a separate production process. Moreover, the present invention allows a user to manage each print job to ensure timely arrival of the job at the desired customer location.

2. Problems in the Art

Currently, most large scale printing operations initially print a set of documents. Printed shipping labels or envelopes are typically generated in a separate print job or received as pre-printed materials from the intended delivery company. Using separately printed or pre-printed shipping materials requires the shipping materials be merged with the documents in a separate production process. Merging the documents and the shipping materials is typically done by hand and at great expense. Moreover, because the shipping materials must be matched to any customer specific documents, errors frequently arise. In one example, shipping materials can be dropped or otherwise thrown out of order, requiring hand sorting and assembly of the documents and the shipping materials. It is therefore desirable to avoid having to merge shipping materials with printed documents, thereby avoiding a "matched mailing" situation and minimizing costs and errors.

Computer software exists today that allows a printing company to create large numbers of customer specific documents with a minimum of data entry. Such printing methods are typically referred to as variable data printing. Using variable data printing, it is possible to print customer tailored documents containing customer specific offers, promotions, coupons, etc. Many of these customer specific items are time sensitive and require a response from the customer within a set period of time that begins on the date a customer receives the document. In the past, determining the date the customer receives the document has required careful monitoring of documents delivered to each customer. This required the company to keep track of a multitude of varying delivery dates resulting in a multitude of varying dates of expiration for the customer specific offers, promotions, coupons, etc.

If a company would like to send out a number of similar offers, coupons, promotions, etc. to select customers or groups of customers, it is desirable that the company be able to have a common date certain for the expiration of every offer sent out. It is therefore desirable to have a method of printing materials that ensures a common date of delivery.

Delivery of a wide variety of items throughout the world often requires the use of a wide variety of delivery carriers. Additionally, in situations where many different carriers service the same area, one carrier may be less expensive, faster, or more reliable than another carrier. It is therefore desirable to be able to select the desired carrier and/or shipping method that is preferred.

Features of the Invention

A general feature of the present invention is the provision of a method for printing customer specific documents in a manner to ensure a specific date of delivery that overcomes the problems found in the prior art.

Another feature of the present invention is the provision of a method for printing documents and shipping materials such that a single packet of materials is produced and stapled in line without the need to match and merge printed documents in a separate production process.

A further feature of the present invention is the provision of a method for printing customer specific documents in a manner to ensure a specific date of delivery which prioritizes a print request based on date of delivery rather than date of shipment.

Another feature of the present invention is the provision of a method for printing customer specific documents in a manner to ensure a specific date of delivery which allows for the printing of individual shipping materials in line with the corresponding documents to be shipped.

Yet another feature of the present invention is the provision of a method for printing customer specific documents in a manner to ensure a specific date of delivery which allows for shipping preferences and options.

A further feature of the present invention is the provision of a method for printing customer specific documents in a manner to ensure a specific date of delivery which minimizes the amount of inputs required to generate numerous customer specific documents.

A still further feature of the present invention is the provision of a system and method which is computer based.

These, as well as other features and advantages of the present invention will become apparent from the following specification and claims.

SUMMARY OF THE INVENTION

The present invention provides a method for distributing customizable time sensitive documents. The present invention is particularly advantages where there are a great number of customized time sensitive documents to distribute and there is the desire to avoid risk associated with the need to match and merge printed documents in a separate production process, i.e. a "matched mailing" situation. The present invention provides for the time of printing to be determined by an intended time of receipt of the documents. The present invention takes into account that different delivery methods can be used and will take different amounts of time.

The present invention provides for distributing time sensitive documents. The method of distribution includes receiving an intended delivery location with each of a plurality of documents, determining a time required to deliver each document to the intended delivery location, determining a desired date of receipt; and printing each document to allow for the time required to deliver each document on the desired date of receipt.

DETAILED DESCRIPTION OF THE PREFERRED EMBODIMENT(S)

Figure 1:
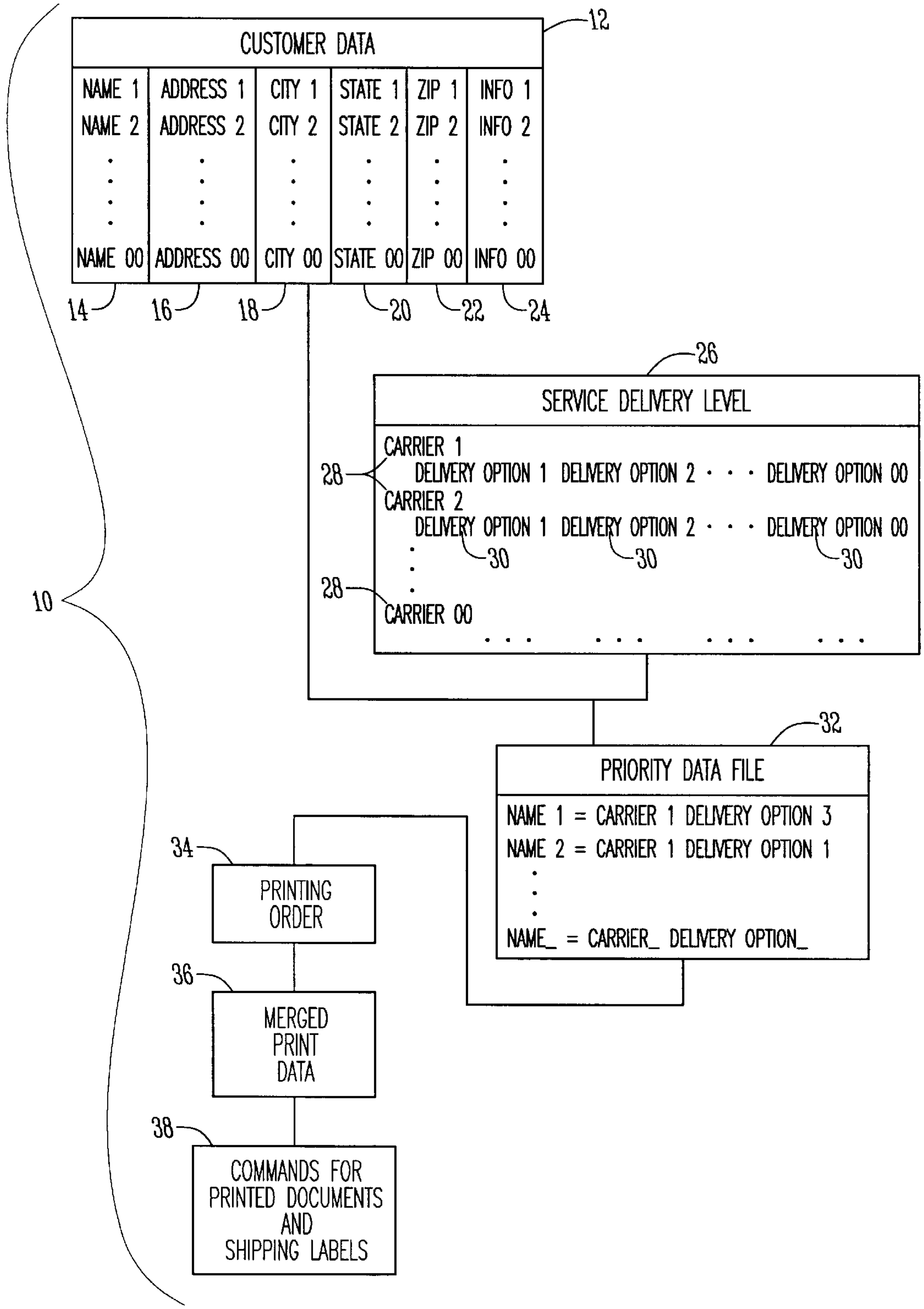
FIG. 1 is a flow chart of one embodiment of the overall process of the present invention.

The present invention will be described as it applies to its preferred embodiment. It is not intended that the present invention be limited to the described embodiment. It is intended that the invention cover all modifications and alternatives which may be included within the spirit and scope of the invention. As is shown in FIG. 1, the system and method 10 of the present invention includes two initial databases, customer data 12 and service delivery level data 26. The customer data 12 generally includes a plurality of names 14 with corresponding address 16, city 18, state 20, zip code 22, and other pertinent customer specific information 24. The service delivery level database 26 generally includes information for a plurality of carriers 28 which may include a number of carrier specific delivery options 30. The data in either the customer database 12 or the service delivery level database 26 may be stored as a .txt or text file or in any other suitable database format. Preferably, each database is suitable for use in a variable programming or variable data printing system as is well known in the art. The customer database 12 may include additional fields for drop dates and shipping information.

As is shown in FIG. 1, the customer database 12 and the service delivery level database 26 are then merged to create a priority data file 32 in which the customer data is reviewed to determine which carriers are available and which delivery options for each carrier are available to serve each individual customer.

The particular carrier and/or delivery options selected may depend upon whether more than one carrier serves the area in which the individual customer is located, the preferences of the user as to any particular carrier and/or delivery option. This priority data file 32 is used to determine the printing order 34. After the printing order 34 has been determined, the merged print data 36 is compiled and the commands for generating the printed documents and shipping labels 38 are given.

Preferably, many of the commands and steps of the present invention may be carried out using one or more Microsoft Visual Basic® scripts. Although these scripts are preferably programmed in Microsoft Visual Basic scripts, Java and any other programming methodology may be suitable for use. It is preferred that the computer programming or scripts involved in the present invention be carried out over an intranet network including at least one base computer that is operatively connected to one or more printers. Any number of additional computers, including laptops, desktops, personal digital assistants, etc. may be connected to the base computer using any known means including hardwire connection, wireless connection, or intranet or Internet connections.

Figure 2:
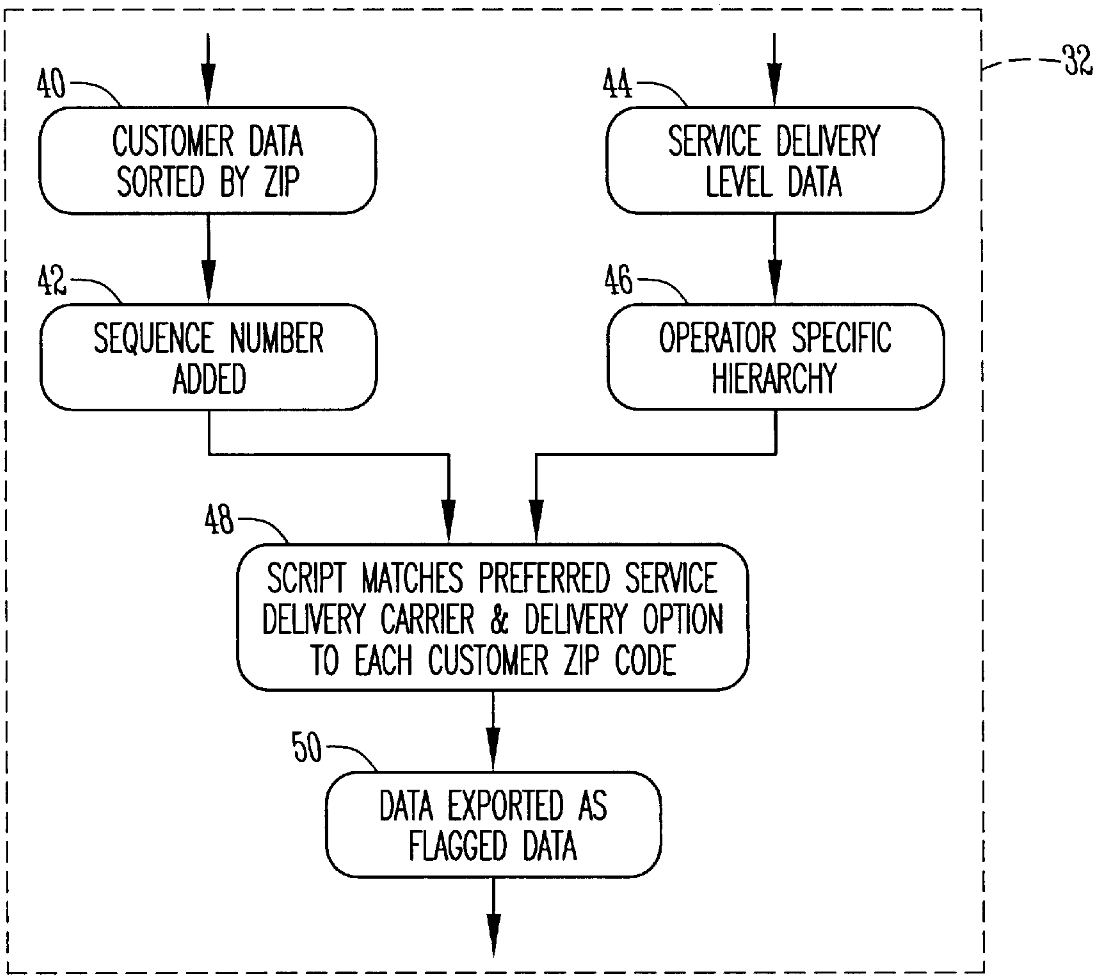
FIG. 2 is a more detailed flow chart relating to the priority data file of FIG. 1.

Several of the steps involved in the present invention will now be described in more detail. Initially, as is shown in FIG. 2, the customer data is sorted or grouped by zip code 40 and a sequence number 42 is added to each customer entry. Again the sort and addition functions are carried out by scripts. However, these functions may also be carried out in any ordinary database management software such as Microsoft Access®.

Next, the service delivery level data is also sorted by zip code and ranked according to the user or operator specific hierarchy 46 (i.e. whether the user prefers any particular carrier, is searching for the best price, or is seeking guaranteed overnight delivery, etc.) All of the data compiled during these rankings is then sent to a developers tool such as ConnectShip™ which is used to create Visual Basic scripting. The scripting in ConnectShip™ flags each record and determines its service level, i.e. which service delivery carrier and which delivery option should be used for each customer. This determination can be made based upon the customer's zip code. This compiled data is then exported as flag data 50 for use in prioritizing the printing cycles.

Figure 3:
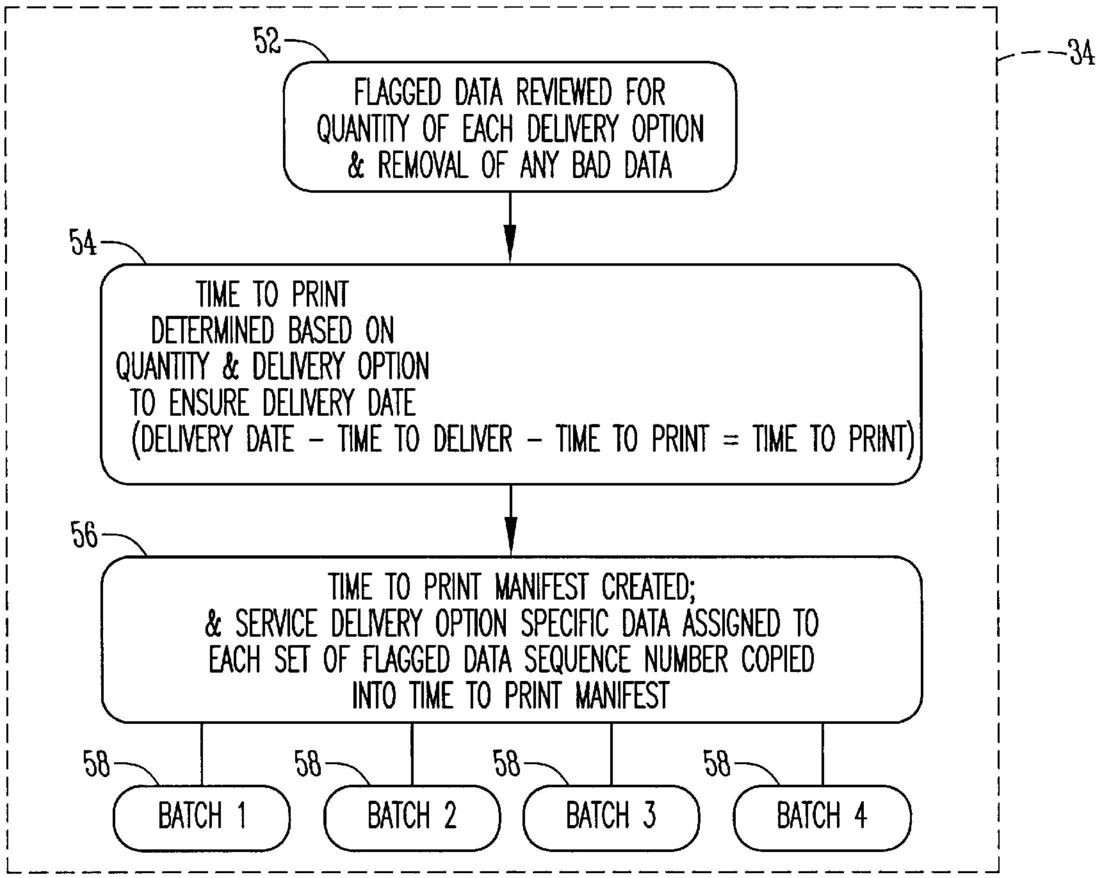
FIG. 3 is a more detailed flow chart of the printing order step of FIG. 1.

As shown in FIG. 3, the flag data is reviewed 52 to determine the quantity of documents to be delivered according to each delivery option and remove any bad data. Based in part on the quantity of documents to be delivered according to each delivery option and the desired delivery date, the time to print 54 can be calculated. For example, if it will take one day to ship a document to the intended customer, and one additional day to get the customer document through the printing process, the printing process will be scheduled with a time to print that is two days before the desired delivery date. This series of calculations is performed for each document to be printed and the results are generated in a time to print manifest 56. The time to print manifest 56 will essentially create a plurality of batches 58 of shipping related data that is correlated to individual customers and prioritize to ensure a desired date of delivery.

Figure 4:
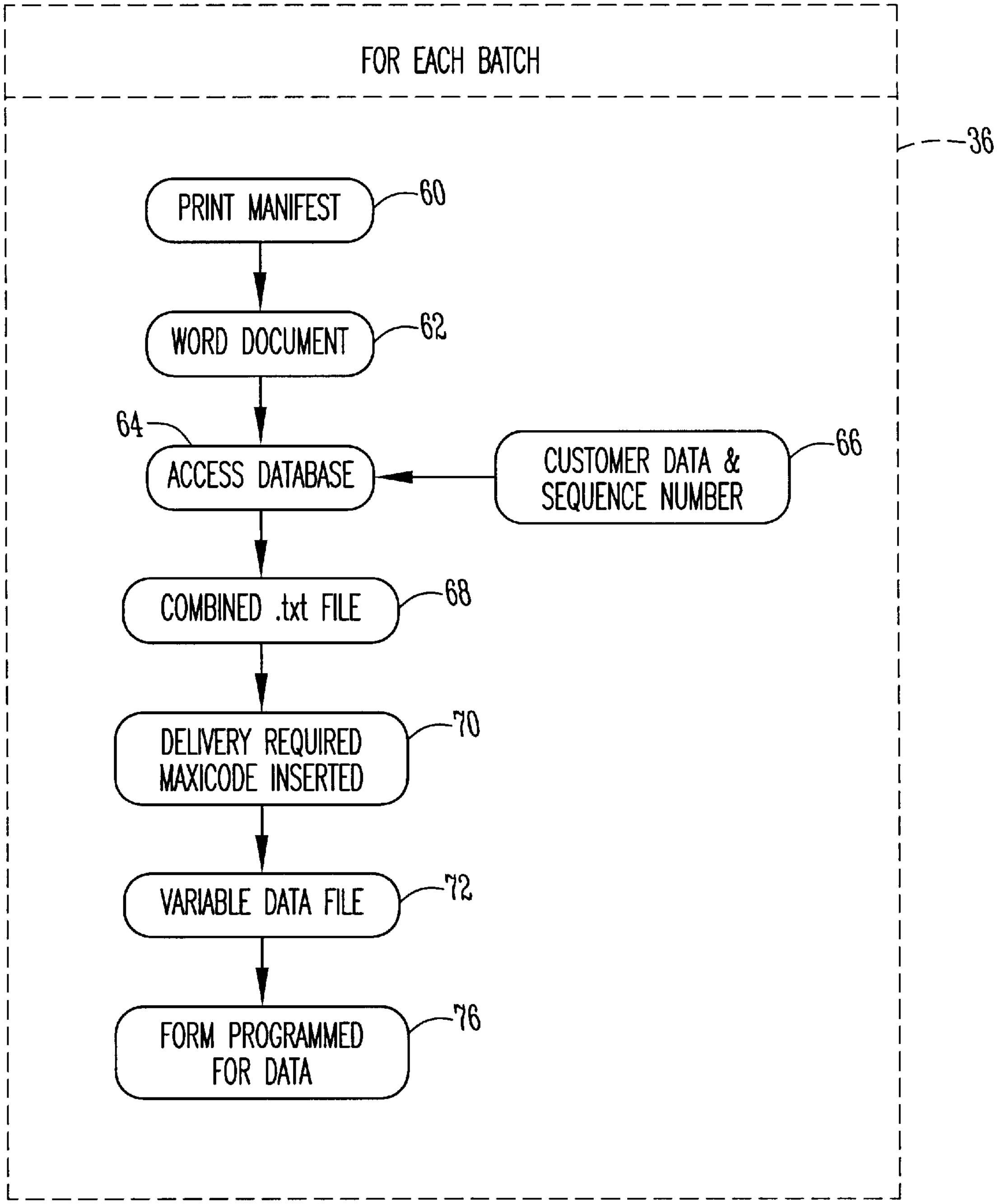
FIG. 4 is a more detailed flow chart of the merged print data step of FIG. 1.

As is shown in FIG. 4, for each batch 58 of shipping data, the shipping data of the print manifest 56 is converted into a Microsoft Word® document 62 or .txt file in order to parse out the sequence number that identifies the particular customer for which this shipping information should be used. This data is then imported into a Microsoft Access® database 64. In the Microsoft Access(& database 64, additional raw customer data 66 including a sequence number is imported. The customer data table 66 and the Microsoft Word® document data table 62 are linked by a sequence number to make a single table query. Here, errors can be discovered by ensuring that the sequence number for the shipping information matches the sequence number for the customer data. If there is no match, an error is detected and removed. Eventually, a text file 68 is created that combines the customer data with the customer specific shipping data. Next, any additional graphics or shipping information may be included in the data file. This may include inserting bar code data or maxicode data as required by any particular shipping company such as UPS.

Figure 5:
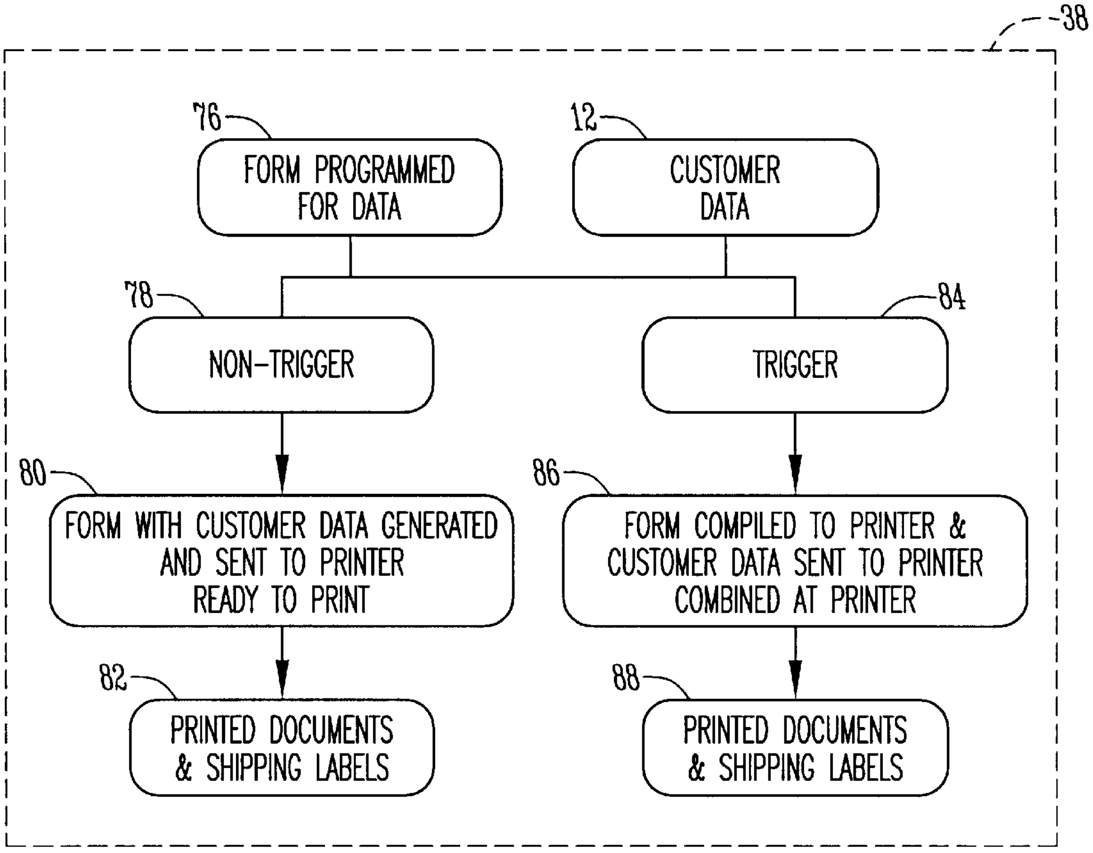
FIG. 5 is a more detailed flow chart of the command for printed documents and shipping labels of FIG. 1.

Thereafter, the entire data file is sent to a variable data file 72. The variable data file 72 is the file from which information may be obtained to perform variable data printing. One of the first steps in variable data printing is the creation of the variable data form 76. This process is well known in the art. After the form 76 has been programmed for the appropriate customer data 12, the two are merged together to create the individual customer specific shipping materials and documents. As is shown in FIG. 5, the merging process can take place either before data is sent to the printer or as data is sent to the printer. Depending upon the printer model chosen, a trigger 84 may be present which allows the printer to compile the form and the customer data at the printer 86. After being compiled at the printer, the documents and shipping label for each customer are printed 88 such that they come out stapled or bound together as a single packet. A triggered system is preferably used on printers such as the Heidelberg 9110.

Figure 6:
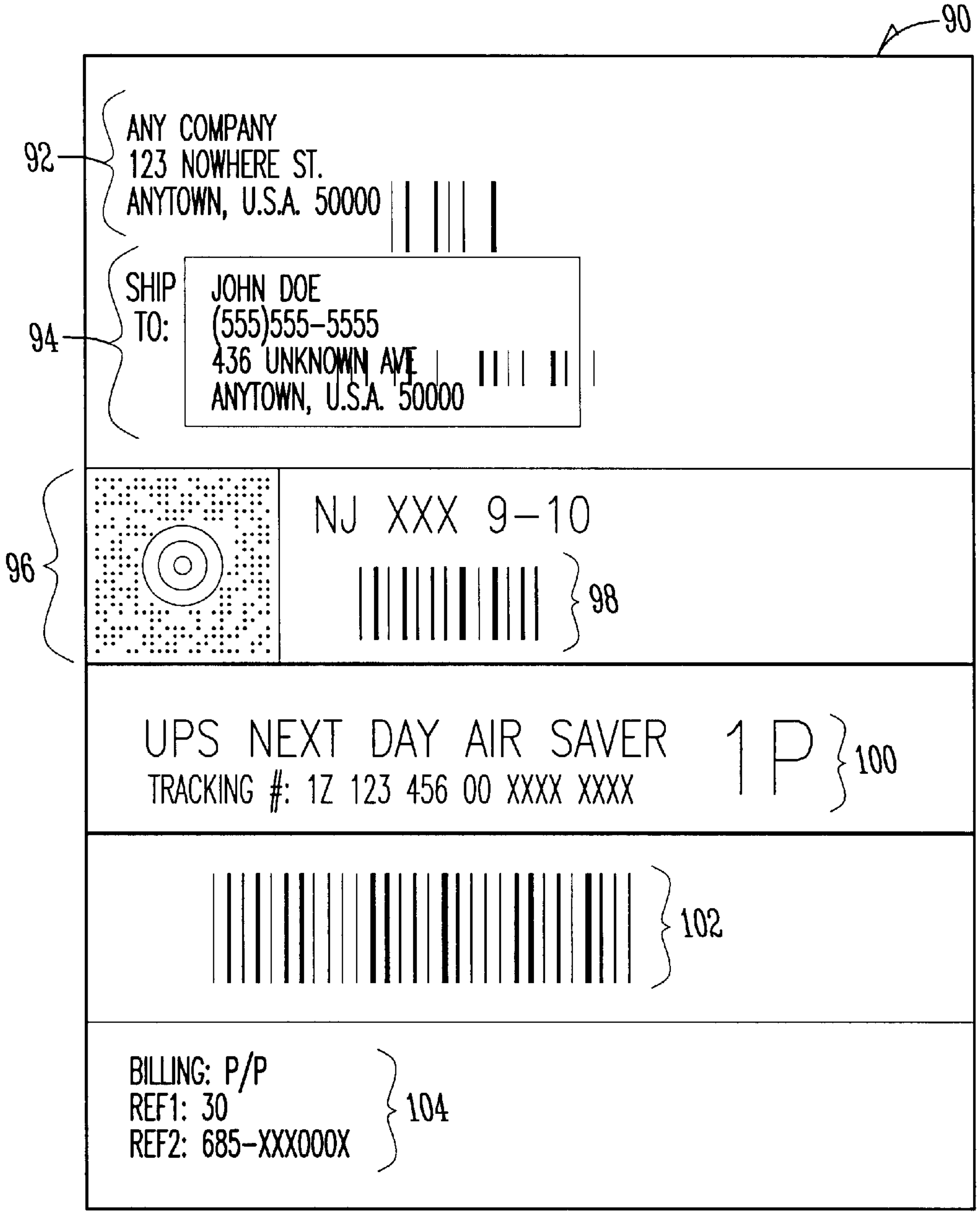
FIG. 6 is an example of a shipping document created by the present invention.

FIG. 6 illustrates a shipping label 90. The shipping label includes shipping information 94 associated with an addressee. In addition, there is information associated with a sender 92 and various other information associated with the shipping label 90. For example, maxicode 96 can be shown or an order number bar code 98 can be shown. In addition, dependant upon the carrier being used, a tracking number 100 can be shown.

Also, a tracking number bar code 102 could be shown. Other information that can be 10 included such as billing and reference numbers 104 can also be included within the shipping label 90. The present invention contemplates numerous variations in the type and amount of information shown on the shipping label as varies from business to business.

Figure 7:
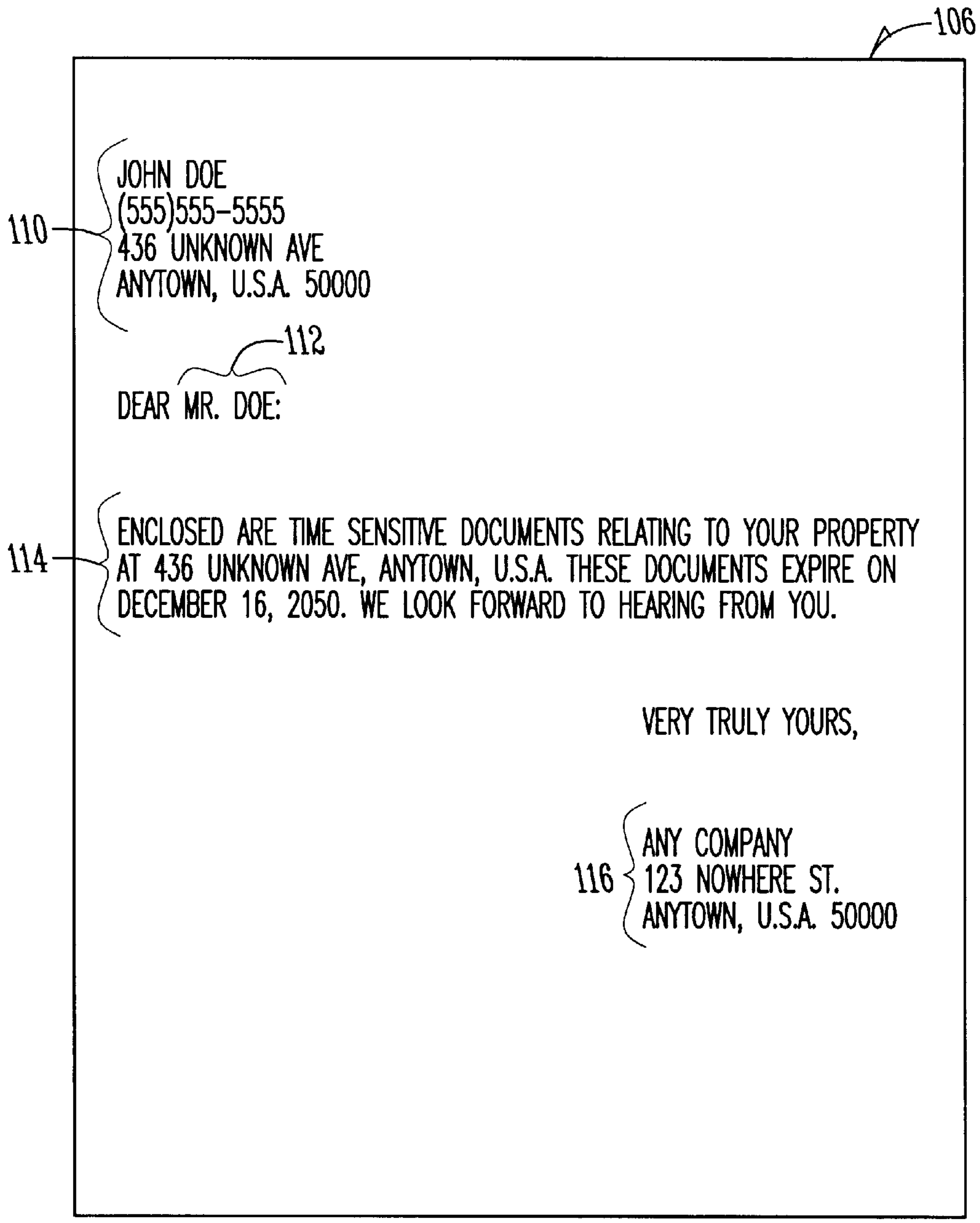
FIG. 7 is an example of a possible customer specific document created by the present invention.

FIG. 7 shows a typical document that may be created during the variable print process including customer specific address information 110, customer specific salutation 112 and a textual body that is tailored to including customer specific information 1 14. Additionally, user specific information may be included in the signature line 116.

Figure 8:
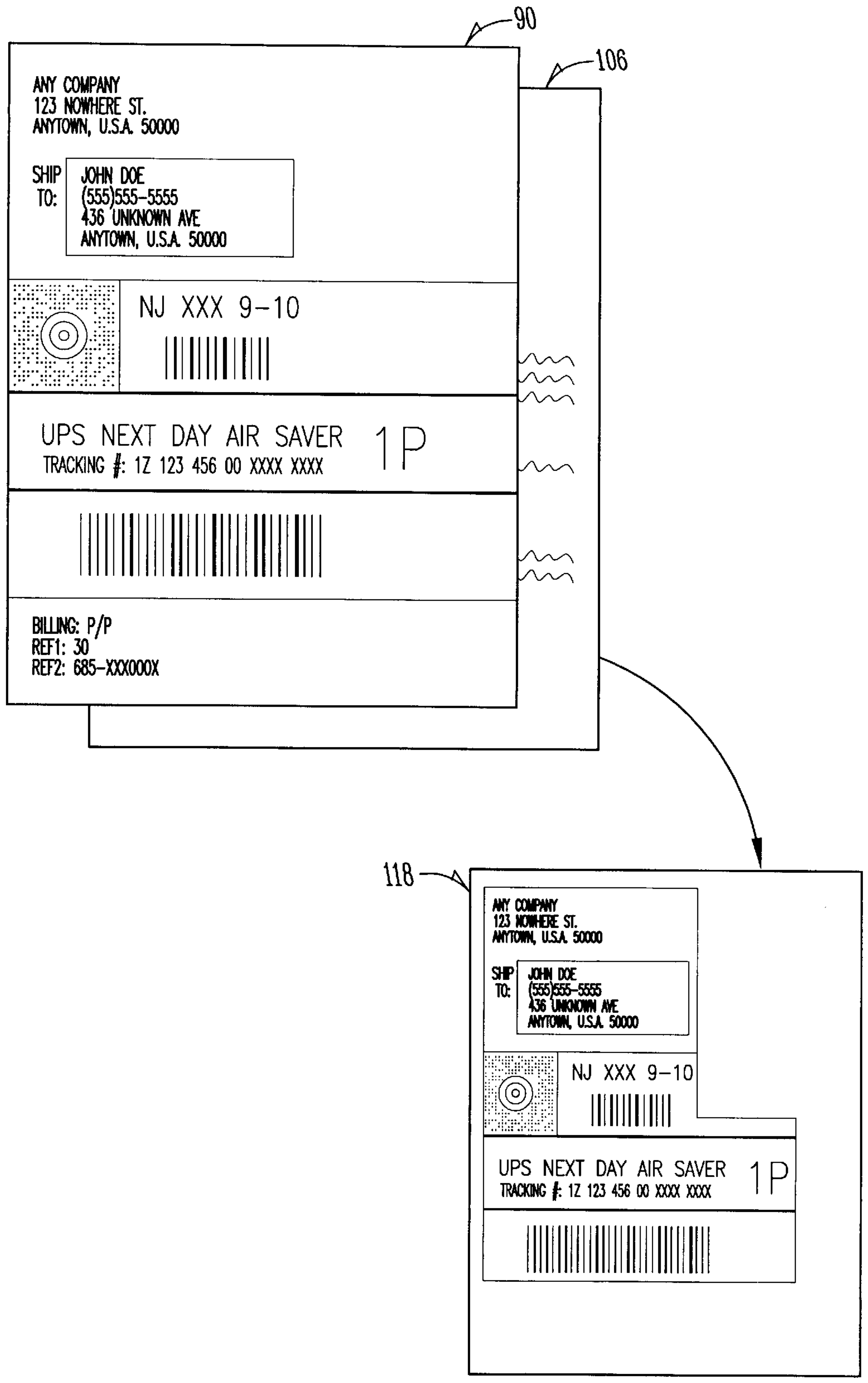
FIG. 8 show the example of FIG. 6 printed prior to or following the example of FIG. 7 during the printing process and subsequently placed into a delivery medium, such as a windowed envelope.

FIG. 8 shows the final product including a customer specific shipping label 90 and a customer specific document 106. Varying commands may be included in the VB script to instruct the printer to staple these documents together, fold these documents in a desired manner, or otherwise secure the documents into a packet format. Once the documents are secured in a stapled or bound packet format, they are placed in an envelope 118 or other shipping medium. In this manner, the problems associated with merging shipping documents and customer specific documents can be avoided. Further, documents can be printed in an order such that all documents are received by the desired recipients on the same date regardless of recipient location or shipping method used to transfer the documents to the desired shipping location.

A general description of the present invention as well as a preferred embodiment of the present invention has been set forth above. Those skilled in the art to which the present invention pertains will recognize and be able to practice additional variations in the methods and systems described which fall within the teachings of this invention.

Accordingly, all such modifications and additions are deemed to be within the scope of the invention which is to be limited only by the claims appended hereto.

What is claimed is:

1. A method for distributing time-sensitive documents, comprising:

receiving shipping data from a customer, the shipping data having a plurality of records, each of the plurality of records including at least a recipient field, a recipient address field, a recipient zip code field, and at least one variable recipient field to be used for customizing a document in a manner independent of recipient name, recipient address, and recipient zip code;

determining a carrier service level for each record;

receiving an intended delivery time associated with each record;

determining an intended time of shipment for documents associated with each record based on the carrier service level for each record and the intended delivery time associated with each record;

prioritizing the plurality of records based on the intended time of shipment;

printing a customized document incorporating customized information based on the at least one variable recipient field for each record;

shipping the customized document at the intended time of shipment using the associated carrier service level;

the printing and shipping occurring consecutively and without delay such that shipping occurs immediately after printing.

2. The method of claim 1 wherein the intended delivery time is a particular date.

3. The method of claim 1 wherein the shipping data is from a text file.

4. The method of claim 1 wherein the shipping data is from a database file.

5. The method of claim 1 further comprising printing a shipping label associated with each customized document inline with each customized document such that each shipping label and associated Customized document are readily physically associated.

6. The method of claim 5 wherein the shipping label associated with each document is secured to the customized document.

7. The method of claim 6 wherein a staple is used to secure the shipping label to the customized document.

* * * * *